(12) United States Patent
Mizutani et al.

(10) Patent No.: US 7,378,838 B2
(45) Date of Patent: May 27, 2008

(54) ROTATION ANGLE DETECTION DEVICE HAVING MAGNETIC FLUX ALTERATION UNIT

(75) Inventors: Akitoshi Mizutani, Okazaki (JP); Takao Ban, Toyahashi (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/330,108

(22) Filed: Jan. 12, 2006

(65) Prior Publication Data
US 2006/0152215 A1 Jul. 13, 2006

(30) Foreign Application Priority Data
Jan. 12, 2005 (JP) ............... 2005-005347

(51) Int. Cl.
*G01B 7/30* (2006.01)
(52) U.S. Cl. ............... 324/207.2; 324/207.25
(58) Field of Classification Search ..............
324/207.12–207.25, 173–174; 338/32 R, 338/32 H
See application file for complete search history.

(56) References Cited

U.S. PATENT DOCUMENTS

| | | | |
|---|---|---|---|
| 4,893,502 A | 1/1990 | Kubota et al. | |
| 5,055,781 A | 10/1991 | Sakakibara et al. | |
| 5,544,000 A | 8/1996 | Suzuki et al. | |
| 5,757,179 A * | 5/1998 | McCurley et al. | 324/207.2 |
| 6,586,929 B1 * | 7/2003 | Luetzow | 324/207.24 |
| 6,724,185 B2 * | 4/2004 | Ooki et al. | 324/207.2 |
| 6,798,195 B2 * | 9/2004 | Luetzow | 324/207.24 |
| 7,023,202 B2 * | 4/2006 | Hagino et al. | 324/207.25 |
| 7,088,095 B1 * | 8/2006 | Busch | 324/207.2 |
| 2004/0061495 A1 | 4/2004 | Shimomura et al. | |
| 2004/0189288 A1 | 9/2004 | Mizutani et al. | |
| 2004/0251896 A1 | 12/2004 | Mizutani et al. | |

FOREIGN PATENT DOCUMENTS

JP  2-122205  5/1990

* cited by examiner

*Primary Examiner*—Jay M Patidar
(74) *Attorney, Agent, or Firm*—Nixon & Vanderhye PC

(57) ABSTRACT

A rotation angle detection device has a magnetism detection unit, a magnetic flux generation unit for applying magnetic flux to the magnetism detection unit, and a magnetic flux alteration unit provided for the magnetic flux generation unit. The magnetic flux generation unit is rotated relatively to the magnetism detection unit. A relative rotation angle between the magnetism detection unit and the magnetic flux generation unit is detected based on a density of the magnetic flux passing through the magnetism detection unit. The magnetic flux alteration unit alters a distribution of the magnetic flux generated by the magnetic flux generation unit, to compensate a deviation of the distribution of the magnetic flux.

18 Claims, 6 Drawing Sheets

ROTATION ANGLE DETECTION DEVICE HAVING MAGNETIC FLUX ALTERATION UNIT

CROSS REFERENCE TO RELATED APPLICATION

This application is based on a Japanese Patent Application No. 2005-5347 filed on Jan. 12, 2005, the disclosure of which is incorporated herein by reference.

FIELD OF THE INVENTION

The present invention relates to a rotation angle detection device for detecting a relative rotation angle between two members (e.g., rotation member and non-rotation member).

BACKGROUND OF THE INVENTION

Generally, referring to FIGS. 5A and 5B, a rotation angle detection device is provided with a magnetism detection unit J1 (e.g., Hall element embedded in Hall IC) disposed at a rotation axis (named Z-axis), a magnetic flux supply magnet J2 which has a semi-cylinder shape and applies magnetic flux to the magnetism detection unit J1, and a magnetic flux attraction magnet J3 which has a semi-cylinder shape and attracts the magnetic flux applied to the magnetism detection unit J1 by the magnetic flux supply magnet J2.

The magnetic flux attraction magnet J3 and the magnetic flux supply magnet J2, which construct a magnetic flux generation unit, are fixed to the diametrically inner surface of a cylinder-shaped yoke J4. The magnetism detection unit J1 is surrounded by the magnetic flux attraction magnet J3 and the magnetic flux supply magnet J2.

When the relative rotation angle between the magnetic flux generation unit and the magnetism detection unit J1 varies, the density of the magnetic flux orthogonal to the magnetic detection surface of the magnetism detection unit J1 varies (referring to FIG. 2). The magnetism detection unit J1 outputs signals responding to the density of the magnetic flux orthogonal to the magnetic detection surface thereof.

According to the output signals from the magnetism detection unit J1, the rotation angle detection device detects the relative rotation angle between two members where the magnetic flux generation unit (including magnetic flux attraction magnet J3 and magnetic flux supply magnet J2) and the magnetism detection unit J1 are respectively fixed, for example, referring to U.S. Pat. No. 5,544,000, JP-2-122205A, U.S. Pat. No. 5,055,781, U.S. Pat. No. 4,893,502 and US-2004/0189288A1.

However, in this case, influences of a magnetic member (e.g., yoke J4) supporting the magnetic flux attraction magnet J3 and the magnetic flux supply magnet J2, a magnetic member at the vicinity of the rotation angle detection device, and the like may cause a bias (deviation) in the distribution of the magnetic flux, which is applied to the magnetism detection unit J1 by the magnetic-flux attraction magnet J3 and the magnetic flux supply magnet J2.

Specifically, referring to FIG. 6B, in the case where the Z-axis-direction left ends of the magnetic flux attraction magnet J3 and the magnetic flux supply magnet J2 are justified to that of the yoke 14, the magnetic flux generated by the magnetic flux generation unit leaks to the Z-axis-direction right side (of magnetic flux attraction magnet J3 and magnetic flux supply magnet J2) where no magnet is arranged. That is, there exists a magnetic flux leaking portion α at the Z-axis-direction right portion of the yoke J4.

Therefore, the magnetic flux applied to the magnetism detection unit J1 by the Z-axis-direction right ends of the magnetic flux attraction magnet J3 and the magnetic flux supply magnet J2 is abated. As a result, referring to FIG. 6C, the top of the distribution of the magnetic flux applied to the magnetism detection unit J1 deviates (in Z-axis direction) to the opposite side to the magnetic flux leaking portion α.

Therefore, in the case where the arrangement position of the magnetism detection unit J1 deviates in the Z-axis direction, the density of the magnetic flux applied to the magnetism detection unit J1 will significantly vary. Specifically, as shown in FIG. 6C, when the arrangement position of the magnetism detection unit J1 deviates in the range "A" in the Z-axis direction, the density of the magnetic flux applied to the magnetism detection unit J1 will vary in the large range "B".

Because the density of the magnetic flux applied to the magnetism detection unit J1 will significantly vary responding to the Z-axis-direction arrangement error, the absolute accuracy of the rotation angle detection device is deteriorated.

When the design alteration of a part of the rotation angle detection device is required because of a mounting restriction (in vehicle, for example) or an purpose for cost reduction, the Z-axis-direction centers of the magnetic-flux attraction magnet J3 and the magnetic flux supply magnet J2 are to deviate from the magnetism detection unit J1 when being viewed in the Y-axis direction. In this case, the top of the distribution of the magnetic flux applied to the magnetism detection unit J1 deviates in the Z-axis direction.

For the sake of the malfunction restriction, it is necessary for the design of the rotation angle detection device to be significantly altered. Therefore, the cost is greatly increased due to the specification variation.

SUMMARY OF THE INVENTION

In view of the above-described disadvantage, it is an object of the present invention to provide a rotation angle detection device, in which a distribution deviation of magnetic flux applied to a magnetism detection unit by a magnetic flux generation unit is restricted while a cost increase is suppressed.

According to an aspect of the present invention, a rotation angle detection device is provided with a magnetism detection unit, a magnetic flux generation unit for applying magnetic flux to the magnetism detection unit, and a magnetic flux alteration unit which is arranged at the magnetic flux generation unit. The magnetic flux generation unit is rotated relatively to the magnetism detection unit. A relative rotation angle between the magnetism detection unit and the magnetic flux generation unit is detected based on a density of the magnetic flux passing through the magnetism detection unit. The magnetic flux alteration unit alters a distribution of the magnetic flux which is applied to the magnetism detection unit by the magnetic flux generation unit, to restrict a deviation of the distribution of the magnetic flux.

Therefore, by only providing the magnetic flux alternation unit (e.g., magnetic flux abatement unit or magnetic flux augment unit) for the magnetic flux generation unit, the distribution deviation of the magnetic flux applied to the magnetism detection unit by the magnetic flux generation unit can be eliminated without altering members other than the magnetic flux generation unit and altering the arrangement position of the magnetic flux generation unit.

Because the distribution deviation of the magnetic flux applied to the magnetism detection unit by the magnetic flux generation unit is restricted by the magnetic flux alternation unit, the variation of the magnetic flux (applied to the magnetism detection unit) due to the position deviation (mounting error) of the magnetism detection unit can be restricted. Thus, the detection accuracy of the rotation angle detection device can be improved.

In this case, the strong side of the magnetic flux distribution is abated by the magnetic flux abatement unit or the weak side of the magnetic flux distribution is strengthened by the magnetic flux augment unit, the magnetic flux variation at the top of the magnetic flux distribution can be made gentle. Therefore, in the case where the magnetism detection unit is arranged near the top of the magnetic flux distribution, the magnetic flux variation of the magnetism detection unit due to the position deviation (mounting error) of the magnetism detection unit can be reduced. Accordingly, the detection accuracy of the rotation angle detection device can be improved.

According to another aspect of the present invention, a rotation angle detection device is provided with a magnetism detection unit, a magnetic flux generation unit for applying magnetic flux to the magnetism detection unit, and a magnetic flux abatement unit for abating the magnetic flux generated by the magnetic flux generation unit. The magnetic flux generation unit is rotated relatively to the magnetism detection unit. A relative rotation angle between the magnetism detection unit and the magnetic flux generation unit is detected based on a density of the magnetic flux passing through the magnetism detection unit. The magnetic flux abatement unit is arranged at the magnetic flux generation unit and disposed at an opposite side of the magnetism detection unit to a magnetic flux leaking portion, which is disposed at a vicinity of the magnetic flux generation unit and causes the magnetic flux generation unit a biased leakage of the magnetic flux.

Therefore, the distribution deviation of the magnetic flux applied to the magnetism detection unit can be restricted by only arranging the magnetic flux abatement unit at the magnetic flux generation unit, without altering members other than the magnetic flux generation unit and changing the attachment position of the magnetic flux generation unit.

Because the distribution deviation of the magnetic flux applied to the magnetism detection unit by the magnetic flux generation unit is restricted by the magnetic flux abatement unit, the variation of the magnetic flux of the magnetism detection unit due to the position deviation (mounting error) of the magnetism detection unit can be restricted. Thus, the detection accuracy of the rotation angle detection device can be improved.

Moreover, the strong side of the magnetic flux distribution is weakened by the magnetic flux abatement unit, the magnetic flux variation at the top of the magnetic flux distribution can be made gentle. Therefore, in the case where the magnetism detection unit is arranged near the top of the magnetic flux distribution, the magnetic flux variation of the magnetism detection unit due to the position deviation (mounting error) of the magnetism detection unit can be reduced. Accordingly, the detection accuracy of the rotation angle detection device can be improved.

BRIEF DESCRIPTION OF THE DRAWINGS

Other objects, features and advantages of the present invention will become more apparent from the following detailed description made with reference to the accompanying drawings, in which.

Figure 1A:
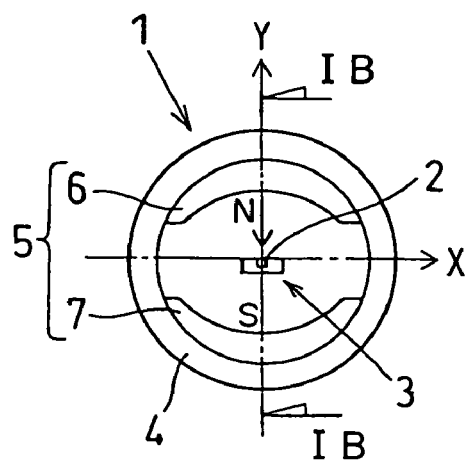
FIG. 1A is a schematic view showing a rotation angle detection device viewed in a Z-axis direction according to a first embodiment of the present invention.

DETAILED DESCRIPTION OF THE PREFERRED EMBODIMENTS (First Embodiment)

A rotation angle detection device according to a first embodiment of the present invention will be described with reference to FIGS. 1A, 1B, 1C and 2. The rotation angle detection device is suitably used to detect, for example, a rotation angle (opening degree) of a throttle valve which is arranged at an air suction passage of an engine mounted at a vehicle.

The rotation angle detection device includes a rotor 1 (rotation member) which is integrally rotated with a shaft of the throttle valve or the like, and a Hall IC 3 in which a magnetism detection unit 2 (e.g., Hall element) is embedded. The Hall IC 3 is supported by a fixed member K (non-rotation member) which is indicated by the broken line in FIG. 1B. The Hall element 2 is disposed at the rotation axis (Z-axis) of the rotor 1.

The rotor 1 is provided with a yoke 4 which is constructed of a substantially cylinder-shaped magnetic material, and a magnetic-flux generation unit 5 for emanating magnetic flux passing through the Hall IC 3, which is arranged at a center portion of the yoke 4.

The magnetic-flux generation unit 5 includes a magnetic flux supply magnet member 6 (first magnet member 6) for applying the magnetic flux to the Hall element 2, and a magnetic flux attraction magnet member 7 (second magnet member 7) for attracting the magnetic flux which is applied to the Hall element 2 by the first magnet member 6.

Each of the first magnet member 6 and the second magnet member 7 has a substantial semi-cylinder shape, for example. The first magnet member 6 and the second magnet member 7 face each other, and are arranged to have a substantial diametrically-divided cylinder shape on the whole.

The radial-direction inner surface of the first magnet member 6 has a N-pole polarity, and the radial-direction inner surface of the second magnet member 7 has a S-pole polarity.

A predetermined air gap is arranged between an arc-shaped end portion (of radial-direction inner side) of the first magnet member 6 and that of the second magnet member 7. The arc-shaped end portions of the magnet members 6 and 7 face each other. The first magnet member 6 and the second magnet member 7 are fixed to the radial-direction inner surface of the yoke 4 to surround the Hall element 2. That is, the first magnet member 6 and the second magnet member 7 are opposite to each other, and the Hall element 2 is disposed in the space between the magnet members 6 and 7.

The Hall IC 3, which is concentrically arranged at the center portion of the rotor 1, is a well-known IC which is integrated with a signal process circuit, the Hall element 2 and the like. The Hall IC 3 outputs voltage signals responding to a density of the magnetic flux orthogonal to the magnetism detection surface of the Hall element 2.

Next, the operation of the rotation angle detection device will be described.

Figure 1B:
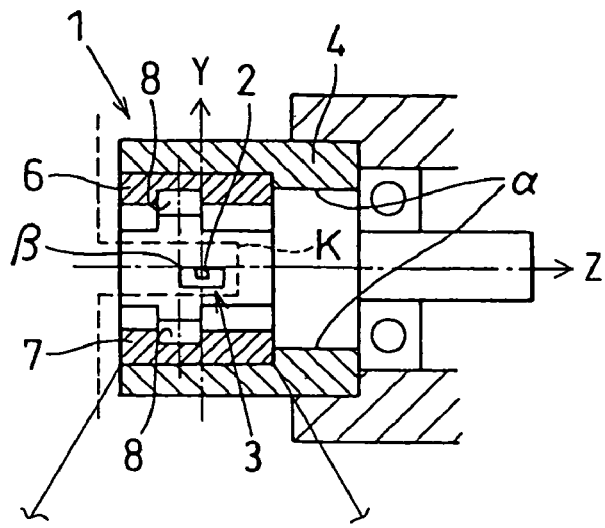
FIG. 1B is a vertical sectional view taken along a line IB-IB in FIG. 1A.

As shown in FIG. 1A and FIG. 1B, the rotation axis of the rotor 1 is named the Z-axis. The magnetism non-induction direction (along magnetism detection surface) of the Hall element 2 is orthogonal to the Z-axis direction and named X-axis. The magnetism detection direction of the Hall element 2 is orthogonal to the magnetism detection surface thereof and named Y-axis.

In this case, the rotation angle of the rotor 1 is defined as 0° when the centerline of the air gap between the first magnet member 6 and the second magnet member 7 is orthogonal to the Y-axis. The rotation angle of the rotor 1 is defined as 90° when the centerline of the air gap between the first magnet member 6 and the second magnet member 7 is perpendicular to the X-axis, referring to FIG. 1A.

In the rotation angle detection device, the first magnet member 6, the Hall IC 3 (Hall element 2) and the second magnet member 7 construct a magnetism circuit, through which the magnetic flux sequentially flows. When the rotor 1 is rotated along with the throttle valve or the like, the magnetic flux which is orthogonal to the magnetism detection surface of the Hall element 2 varies.

Figure 2:
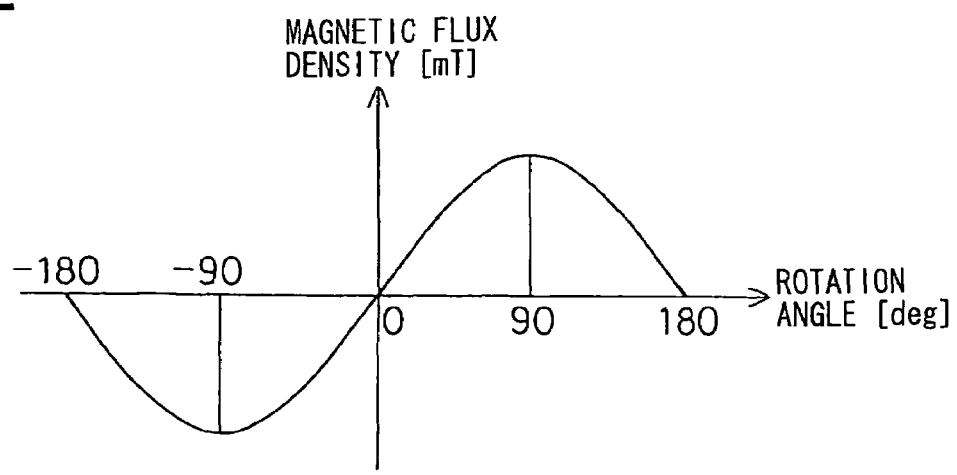
FIG. 2 is a graph showing a relation between the magnetic flux density and rotation angle according to the first embodiment.
Figure 5A:
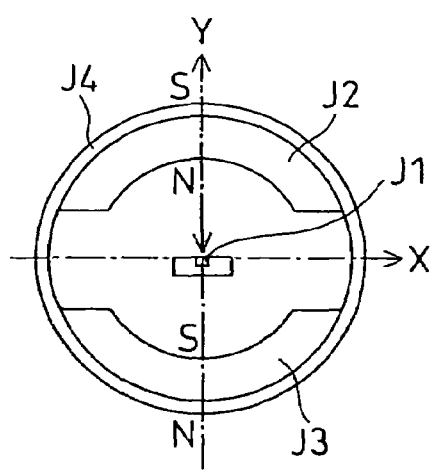
FIG. 5A is a schematic view showing a basic construction of a rotation angle detection device viewed in a Z-axis direction according to a related art.
Figure 5B:
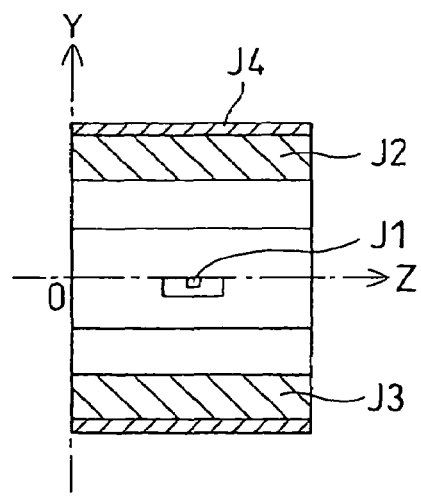
FIG. 5B is a vertical sectional view taken along a Z-axis direction to show the rotation angle detection device.

That is, referring to FIG. 2, when the centerline of the air gap between the first magnet member 6 and the second magnet member 7 is positioned to be perpendicular to the X-axis (that is, rotation angle is 90°), the density of the magnetic flux which is orthogonal to the magnetism detection surface of the Hall element 2 becomes maximum. In the case where the rotation angle of the rotor 1 is larger than 90° or smaller than 90°, the amount of the magnetic flux orthogonal to the magnetism detection surface of the Hall element 2 will decrease responding to the variation of the rotation angle.

When the centerline of the air gap between the first magnet member 6 and the second magnet member 7 is positioned to be perpendicular to the Y-axis (that is, rotation angle is 0°), the density of the magnetic flux orthogonal to the magnetism detection surface of the Hall element 2 becomes zero.

When the rotor 1 is further rotated to the minus side with respect to the position of the rotation angle of 0°, the amount the magnetic flux which is orthogonal to the magnetism detection surface of the Hall element 2 and has an opposite orientation to that of the magnetic flux corresponding to the rotation angle of 90° of the rotor 1, increases responding to the variation of the rotation angle.

When the rotation angle of the rotor 1 becomes −90°, the density of the magnetic flux which is orthogonal to the magnetism detection surface of the Hall element 2 and has the opposite orientation to that of the magnetic flux corresponding to the rotation angle of 90° becomes maximum.

When the rotor 1 is further rotated to the minus side with respect to the position of the rotation angle of −90°, the amount of the magnetic flux which is orthogonal to the magnetism detection surface of the Hall element 2 and has the opposite orientation to that of the magnetic flux corresponding to the rotation angle of 90° begins to decrease responding to the rotation angle. That is, the density of the magnetic flux which passes through the Hall element 2 and has the opposite orientation decreases.

Each of the magnet members 6 and 7 is provided with a radial-direction thickness having a distribution (that is, distribution when being viewed in Z-axis direction) along the circumferential direction (i.e., rotation direction) thereof as shown in FIG. 1A. In this case, the radial-direction thickness of the magnet member 6, 7 becomes gradually smaller from the circumferential center thereof toward the two circumferential ends thereof. That is, the radial-direction thickness of the magnet member 6, 7 becomes largest at the circumferential center thereof.

Therefore, referring to FIG. 1A, the distance between the Hall element 2 and the radial-direction inner surface of the magnet member 6, 7 becomes gradually larger from the side of the circumferential center of the magnet member 6, 7 toward the side of the two circumferential ends thereof. That is, the variation of the radial-direction thickness of each of the magnet members 6 and 7 is set, in such a manner that the density of the magnetic flux passing through the Hall element 2 keeps steady (fixed) even when the position of the Hall element 2 deviates in the X-axis direction from the circumferential center of the magnet member 6, 7.

Thus, even when the position of the Hall element 2 deviates in the X-axis direction from the circumferential center of the magnet member 6, 7 due to the mounting error or the like, the density increase of the magnetic flux passing through the Hall element 2 due to the position deviation thereof can be compensated because the magnet member 6, 7 becomes gradually thinner (in radial direction) toward the outer side of the deviation direction (i.e., X-axis direction) thereof.

That is, the density increase of the magnetic flux applied to the Hall element 2 can be restricted even when the position of the Hall element 2 deviates in the X-axis direction due to the mounting error or the like. Therefore, the detection error in the rotation angle can be restricted.

Nest, the background of the rotation angle detection device according to the first embodiment will be described.

In the case where the yoke 4 (supporting magnet members 6 and 7) of the rotation angle detection device is mounted at the vehicle or the like, the distribution of the magnetic flux applied to the Hall element 2 by the magnet members 6 and 7 may be biased (deviates) due to the influence of a magnetic member (e.g., member in engine cabin) disposed at the vicinity of the rotation angle detection device.

Specifically, as shown in FIG. 1B, because the left ends of the Z-axis direction of the magnet members 6 and 7 are justified to (aligned to) the left end of the Z-axis direction of the yoke 4 which is constructed of the magnetic material such as iron, the magnetic flux generated by the magnet members 6 and 7 escapes to the Z-axis-direction right side (where no magnet is arranged) of the magnet members 6 and 7. That is, referring to FIG. 1B, there exists a magnetic flux leaking portion a at the Z-axis-direction right portion of the yoke 4.

Therefore, it is weakened that the magnetic flux which is applied to the Hall element 2 by the Z-axis-direction right ends (at side of magnetic flux leaking portion α shown in FIG. 1B) of the magnet members 6 and 7. As a result, as indicated by the broken line in FIG. 1C, the top of the distribution of the magnetic flux applied to the Hall element 2 deviates to the Z-axis-direction left side, which is an opposite side to the magnetic-flux leaking portion α.

Therefore, when the position of the Hall element 2 deviates in the Z-axis direction due to the mounting error or the like, the density of the magnetic flux applied to the Hall element 2 significantly varies, so that the absolute accuracy of the rotation angle detection device is deteriorated.

Next, the characteristics of the rotation angle detection device according to the first embodiment will be described.

As described above, the top of the distribution of the magnetic flux applied to the Hall element 2 by the magnet members 6 and 7 is biased to the opposite side to the magnetic-flux leaking portion a in the Z-axis direction, due to the arrangement relation between the yoke 4 and the magnet member 6, 7.

Figure 1C:
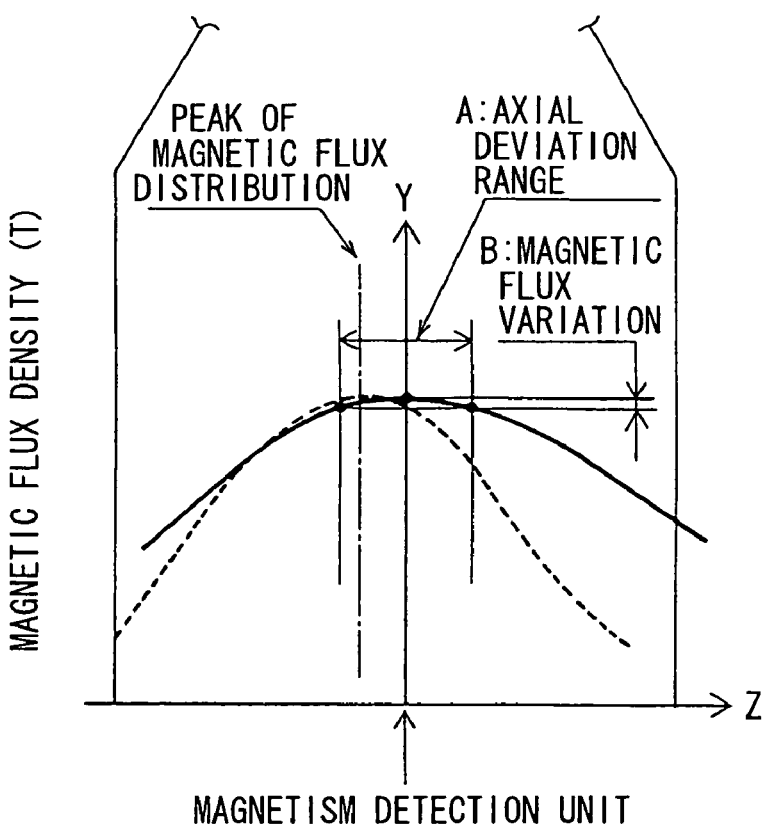
FIG. 1C is a graph showing a distribution of magnetic flux density in the Z-axis direction.

According to the present invention, parts of the magnet members 6 and 7 are respectively provided with a magnetic flux alteration unit for altering the distribution of the magnetic flux, so that the distribution deviation (indicated by broken line in FIG, IC) of the magnetic flux applied to the Hall element 2 by the magnet members 6 and 7 is eliminated as indicated by the solid line in FIG. 1C.

In the first embodiment, the magnetic flux alteration unit arranged at the part of the magnet member 6, 7 is a magnetic flux abatement unit 8 for weakening part of the magnetic flux generated by the magnet member 6, 7.

As described above, the yoke 4 causes the magnet member 6, 7 a biased leakage of the magnetic flux so that there exists the magnetic flux leaking portion a at the Z-axis-direction right side of the magnet members 6 and 7.

In this case, referring to FIG. 1B, each of the magnet members 6 and 7 is provided with the magnetic flux abatement unit 8, which is disposed at the Z-axis-direction left side with respect to the Hall element 2 to abate the magnetic flux generated by the Z-axis-direction left portion of the magnet member 6, 7. Thus, the top of the density distribution of the magnetic flux exerted to the Hall element 2 will correspond to (coincide with) the Z-axis-direction arrangement position of the Hall element 2.

Referring to FIG. 1B, the magnetic flux abatement unit 8 can be, for example, a concave portion formed at the radial-direction inner surface (at Z-axis-direction left side which is opposite side to magnetic flux leaking portion α) of the magnet member 6, 7, to abate the magnetic flux generated by the Z-axis-direction left portion (with respect to Hall element 2) of the magnet member 6, 7. A Z-axis-direction center portion β of the concave portion 8 is arranged at the opposite side of the Hall element 2 to the magnetic flux leaking portion α. That is, the Hall element 2 is disposed between the magnetic flux leaking portion α and the Z-axis-direction center portion β of the concave portion 8.

The concave portion 8 is a groove, which circumferentially extends at the magnet member 6, 7 to eliminate the influence of the rotation of the rotor 1. The depth and the width of the concave portion 8 are set to abate the magnetic flux (generated by Z-axis-direction left portions of magnet members 6 and 7) by the substantially same degree with that of the magnetic flux leaked to the Z-axis-direction right side (magnetic flux leaking portion α as shown in FIG. 1B) of the magnet 6, 7.

Next, the effects of the rotation angle detection device according to this embodiment will be described.

According to this embodiment, the inner surfaces of the magnet members 6 and 7 are respectively provided with the concave portion 8 (magnetic flux abatement unit), which is disposed at the Z-axis-direction left side with respect to the Hall element 2. That is, the concave portion 8 for abating the magnetic flux (generated by magnet members 6 and 7) is positioned at the opposite side of the Hall element 2 to the magnetic flux leaking portion α, which causes the magnet members 6 and 7 the biased magnetic-flux leakage.

Thus, the Z-axis-direction deviation (indicated by broken line in FIG. 1C) of the distribution of the magnetic flux applied to the Hall element 2 by the magnet members 6 and 7 can be compensated, as indicated by the solid line in FIG. 1C.

That is, the distribution deviation of the magnetic flux exerted to the Hall element 2 can be restricted by only arranging the concave portions 8 (magnetic flux abatement unit) at the magnet members 6 and 7, without altering members other than the magnet members 6 and 7 and changing the attachment positions of the magnet members 6 and 7.

Because the strong side (Z-axis-direction left side in FIG. 1B) of the magnetic flux distribution is abated through the concave portion 8 (magnetic flux abatement unit), the magnetic flux variation at the vicinity (of Z-axis direction) of the top of the magnetic flux distribution becomes gentle, referring to FIG. 1C. That is, the density variation of the magnetic flux is moderated at the vicinity of the Z-axis-direction center portion (i.e., vicinity of mounting position of Hall element 2). Thus, the density variation of the magnetic flux applied to the Hall element 2 can be compensated, even when the Hall element 2 deviates in the Z-axis direction due to the mounting error thereof or the like.

That is, the density variation of the magnetic flux applied to the Hall element 2 can be reduced even when the position of the Hall element 2 deviates in the Z-axis direction due to the mounting error thereof or the like, because the Z-axis-direction deviation of the distribution of the magnetic flux exerted to the Hall element 2 by the magnet members 6 and 7 is restricted Accordingly, as shown in FIG. 1C, the density variation of the magnetic flux exerted to the Hall element 2 can be restricted in a small range "B", even when the mounting position of the Hall element 2 (magnetism detection unit) deviates in a large range "A" in the Z-axis direction.

Thus, the detection accuracy (reliability) of the rotation angle detection device can be improved because the Z-axis-direction deviation of the distribution of the magnetic flux exerted to the Hall element 2 is restricted. Moreover, because the variation of the magnetic flux exerted to the Hall element 2 is restricted, the detection accuracy of the rotation angle can be bettered even when the mounting position deviation (in Z-axis direction) of the Hall element 2 exceeds the error range thereof. Therefore, the Z-axis-direction dimensions of the magnet members 6 and 7 can be shortened.

(Second Embodiment)

Figure 3A:
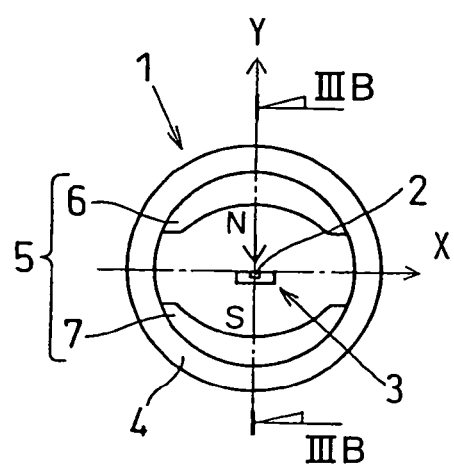
FIG. 3A is a schematic view showing a rotation angle detection device viewed in a Z-axis direction according to a second embodiment of the present invention.

A second embodiment of the present invention will be described with reference to FIGS. 3A, 3B and 3C.

In the case where the radial-direction thickness of the magnet member 6, 7 is provided with the distribution which is even (constant) in the Z-axis direction throughout the magnet member 6, 7, the magnetic flux leaked to the surround from the Z-axis-direction end portions of the magnet member 6, 7 is large so that the magnetic flux strength at the Z-axis-direction center portion of the magnet member 6, 7 becomes relatively strong.

That is, the magnetic flux density distribution of the magnet members 6 and 7 has a substantial mountain shape. As a result, in the case where the arrangement position of the Hall element 2 deviates in the Z-axis direction, the density of the magnetic flux applied to the Hall element 2 significantly varies due to the magnetic flux density distribution having a substantially mountain-shaped incline.

Figure 3B:
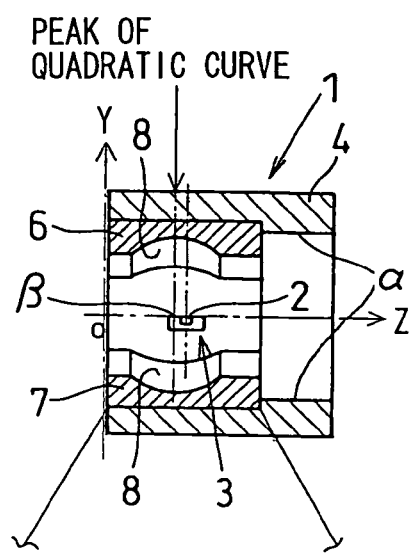
FIG. 3B is a vertical sectional view taken along a line IIIB-IIIB in FIG. 3A.
Figure 3C:
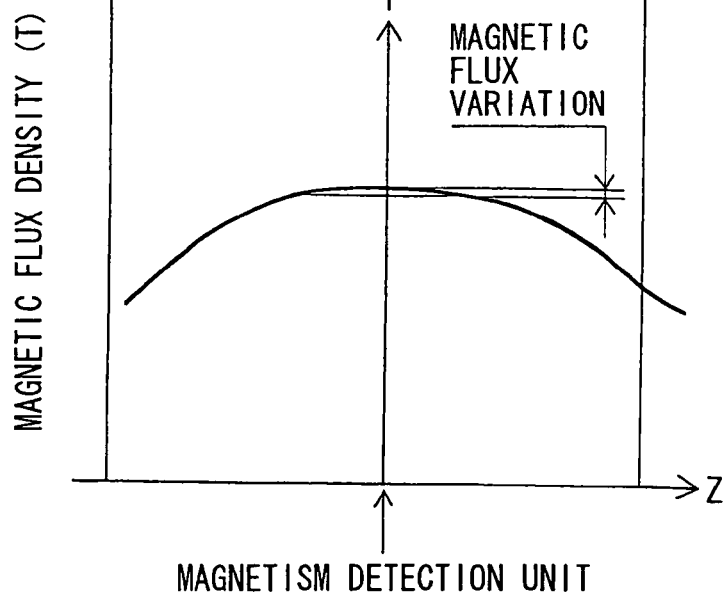
FIG. 3C is a graph showing a distribution of magnetic flux density in the Z-axis direction.

According to the second embodiment, referring to FIGS. 3B and 3C, the radial-direction thickness of each of the magnet members 6 and 7 is set to become gradually larger along the Z-axis direction from the center portion of the magnet member 6, 7 toward the two end portions thereof, to restrict the magnetic flux density variation at the vicinity of the arrangement position of the Hall element 2. That is, as shown in FIG. 3B, each of the magnet members 6 and 7 is provided with the concave portion 8 (for uniforming magnetic flux density), which has a substantially arc-shaped (e.g., quadratic-curve-shaped) cross section taken along the Z-axis direction.

In the second embodiment, the arc-shaped concave portion 8 extends in the circumferential direction at each of the magnet members 6 and 7, and is used as the magnetic flux abatement unit. The Z-axis-direction center β (e.g., peak of quadratic curve) of the concave portion 8 is arranged at the opposite side of the Hall element 2 to the magnetic flux leakage generating portion α, so that the Z-axis-direction deviation of the distribution of the magnetic flux applied to the Hall element 2 by the magnet members 6 and 7 can be restricted.

Therefore, as shown in FIG. 3C, the range in which the magnetic flux density is even is enlarged so that the detection accuracy of the rotation angle can be improved.

(Third Embodiment)

A third embodiment of the present invention will be described with reference to FIGS. 4A, 4B and 4C.

Figure 4C:
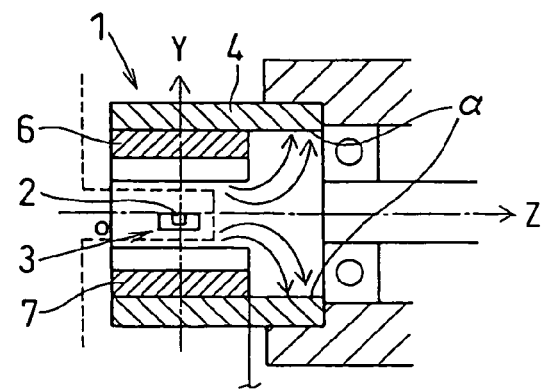
FIG. 4C is a vertical sectional view responding to FIG. 4B to show the case where the Z-axis-direction centers of the magnet members coincide with the magnetism detection unit when being viewed in the Y-axis direction according to a related art.
Figure 4A:
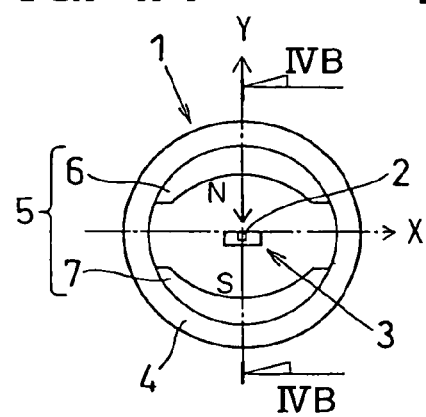
FIG. 4A is a schematic view showing a rotation angle detection device viewed in a Z-axis direction according to a third embodiment of the present invention.
Figure 4B:
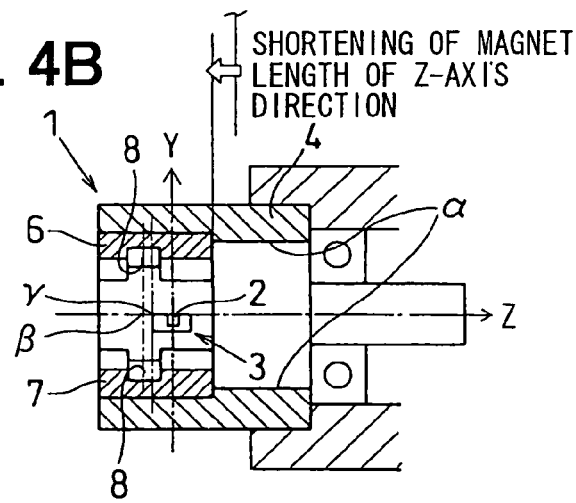
FIG. 4B is a vertical sectional view taken along a line IVB-IVB in FIG. 4A to show the case where Z-axis-direction centers of magnet members deviate from a magnetism detection unit when being viewed in a Y-axis direction.
Figure 6A:
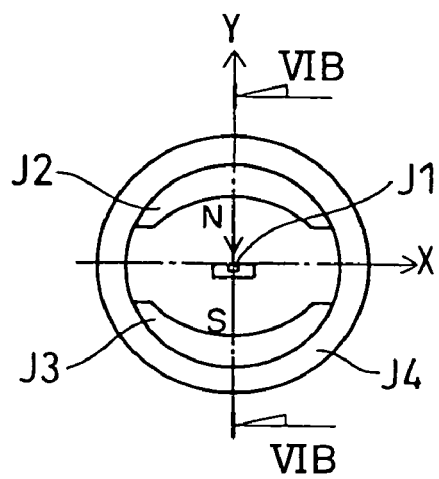
FIG. 6A is a schematic view showing a rotation angle detection device viewed in a Z-axis direction according to a related art.
Figure 6B:
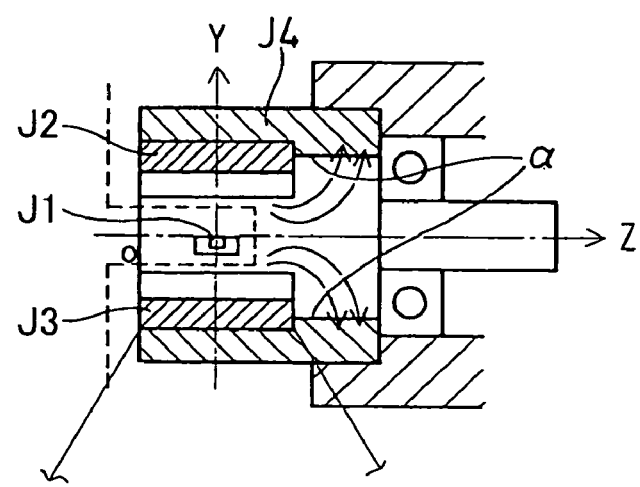
FIG. 6B is a vertical sectional view taken along a line VIB-VIB in FIG. 6A.
Figure 6C:
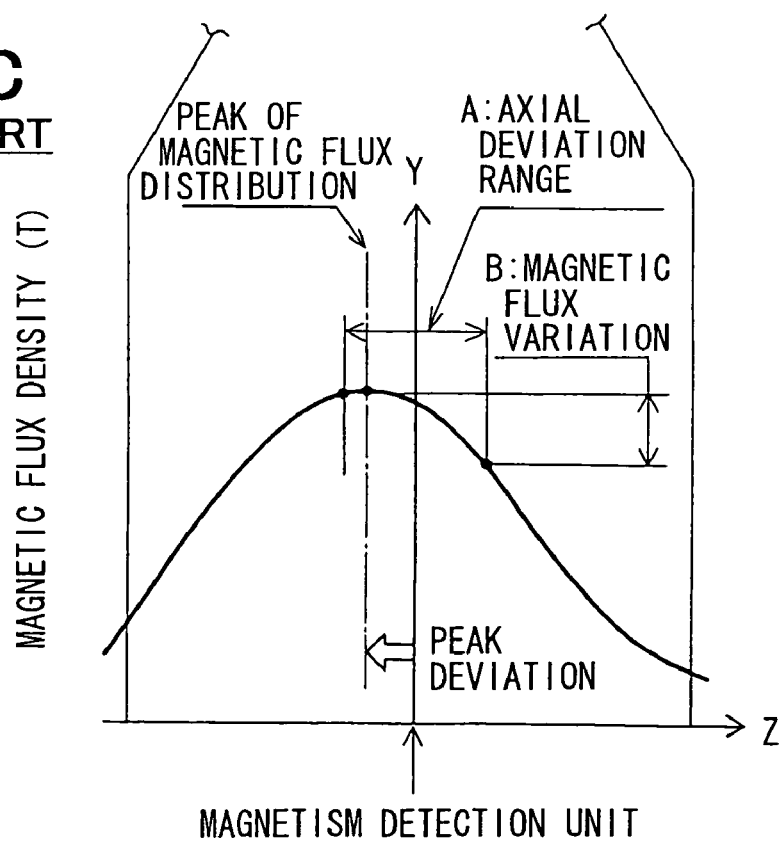
FIG. 6C is a graph showing a distribution of magnetic flux density in the Z-axis direction.

Referring to FIGS. 4B and 4C, there exists the case where the Z-axis-direction center γ of the magnet member 6, 7 are arranged to deviate from the Hall element 2 (when being viewed in Y-axis direction) due to a design alteration of the rotation angle detection device, for example, a shortening of the Z-axis-direction length of the magnet member 6, 7. FIG. 4C shows the case where the Z-axis-direction center of the magnet member 6, 7 corresponds to the Hall element 2 when being viewed in the Y-axis direction. FIG. 4B shows the case where the Z-axis-direction center γ of the magnet member 6, 7 deviates from the Hall element 2 in the Z-axis direction. In this case, the distribution deviation of the magnetic flux exerted to the Hall element 2 will be further enlarged, due to both the magnetic flux leaking portion α and the Z-axis-direction deviation of the center γ of the magnet member 6, 7 from the Hall element 2.

According to the third embodiment, referring to FIG. 4B, the distance of the Z-axis-direction center β (at opposite side of Hall element 2 to magnetic flux leaking portion α) of the concave portion 8 (magnetic flux abatement unit) from the Hall element 2 is enlarged, so as to eliminate the large distribution deviation of the magnetic flux exerted to the Hall element 2. That is, the Z-axis-direction center β of the concave portion 8 is arranged at the further opposite side of the Hall element 2 to the magnetic flux leaking portion α, as compared with those of the above-described first and second embodiments.

(Fourth Embodiment)

In the above-described embodiments, there exits the magnetic flux leaking portion α near the magnet members 6 and 7. The magnetic flux abatement unit 8 (e.g., concave portion) is arranged at the opposite side of the Hall element 2 to the magnetic flux leaking portion α, to restrict the influence of the magnetic flux leaking portion α.

On the other hand, even without the magnetic flux leaking portion α, the Hall element 2 may deviate from the Z-axis-direction center γ of the magnet member 6, 7 because of the design alteration requirement of a part of the rotation angle detection device, for example, the size-reduction in the Z-axis direction of the rotation angle detection device. Therefore, similar to the case where there exists the influence of the magnetic flux leaking portion a, the deviation is caused in the distribution of the magnetic flux which is applied to the Hall element 2 by the magnet members 6 and 7.

According to the present invention, by only providing the magnetic flux abatement unit 8 (e.g., concave portion) for the magnet member 6, 7, the Z-axis-direction deviation of the distribution of the magnetic flux applied to the Hall element 2 by the magnet member 6, 7 can be restricted even when the Hall element 2 deviates from the Z-axis-direction center γ of the magnet member 6, 7. Therefore, the cost increase due to the design alteration of the rotation angle detection device can be restricted.

(Other Embodiment)

Although the present invention has been fully described in connection with the preferred embodiments thereof with reference to the accompanying drawings, it is to be noted that various changes and modifications will become apparent to those skilled in the art.

Figure 7:
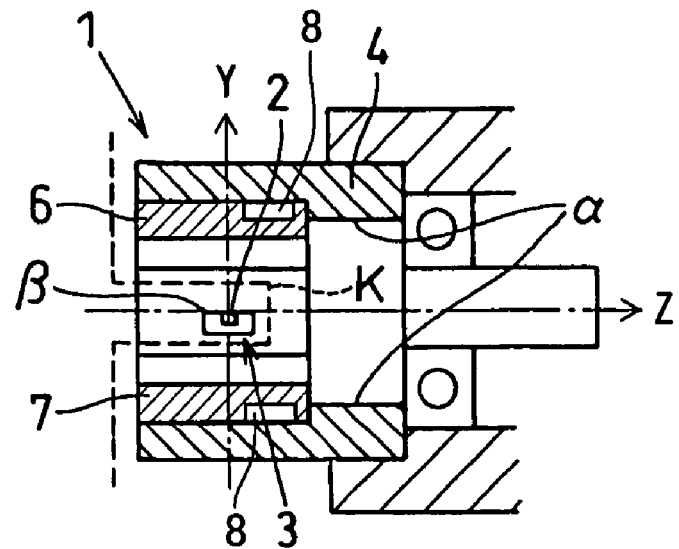
FIG. 7 is a vertical sectional view showing a rotation angle detection device according to an alternate embodiment of the present invention.

In the above-described embodiments, each of the magnet members 6 and 7 is provided with the magnetic flux abatement unit 8 (e.g., concave portion) at the radial-direction inner surface thereof. However, the magnetic flux abatement unit 8 can be also arranged at the radial-direction outer surface of the magnet member 6, 7 to abate the magnet flux, as schematically illustrated in FIG. 7. Moreover, the magnetic flux abatement unit 8 can be also provided for one of the magnet members 6 and 7.

Figure 8:
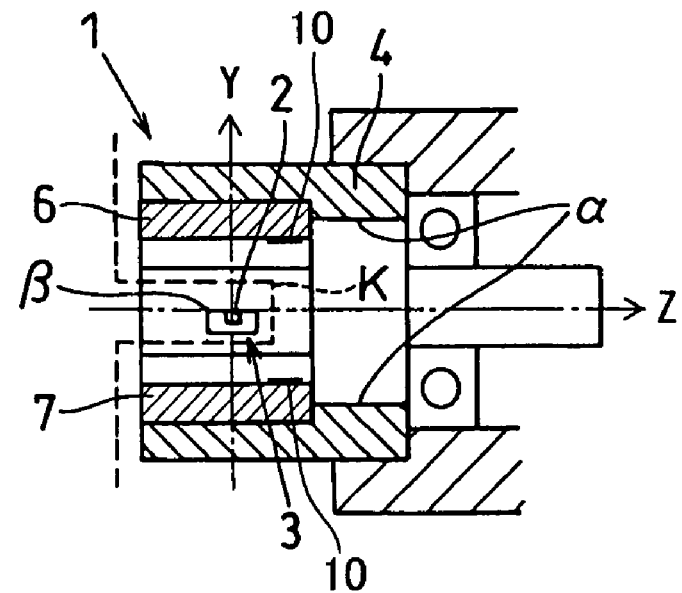
FIG. 8 is a vertical sectional view showing a rotation angle detection device according to a further alternate embodiment of the present invention.

Furthermore, a weak-magnetization member can be also provided for the magnet member 6, 7 instead of the concave portion, to be used as the magnetic flux abatement unit 8. Alternatively, an adhesive member 10 for obstructing the generation of the magnetic flux can be also bonded to a part of the magnet member 6, 7 instead of the concave portion, to be used as the magnetic flux abatement unit 8, as schematically illustrated in FIG. 8. In this case, it is preferable that the adhesive member is constructed of a non-magnetic material to avoid a generation of hysteresis.

In the above-described embodiments, the magnetic flux abatement unit 8 is provided as the magnetic flux alteration unit for restricting the deviation of the magnetic flux distribution. However, a magnetic flux augment unit can be also provided for the magnet member 6, 7 to supplement the magnetic flux leakage due to the magnetic flux leaking portion α. Specifically, the magnetic flux augment unit can be provided for a part of at least one of the magnet members 6 and 7 to eliminate the magnetic flux leakage. The magnetic flux augment unit can be constructed of a convex portion for augmenting the magnetic flux generated by the magnet member 6, 7, or a strong-magnetization member, or an adhesive member made of a permanent magnet for heightening the magnetic flux density, or the like.

In the above-described embodiments, it is examped that the magnetic flux abatement unit 8 is used to restrict the magnetic flux deviation in the Z-axis direction. However, the magnetic flux deviations in the X-axis direction and the Y-axis direction can be also restricted through the magnetic flux abatement unit 8 or the magnetic flux augment unit.

In the above-described embodiments, the present invention is suitably used to restrict the deviation of the magnetic flux distribution, in the case where there exists the magnetic flux leaking portion a due to the partial yoke 4 to which the magnetic flux generation unit 5 (e.g., magnet members 6 and 7) is fixed. However, the present invention can be also used to restrict the deviation of the magnetic flux distribution in the case where a magnetic member (magnetic flux leaking portion α) is arranged at the vicinity of the rotation angle detection device and causes a magnetic flux distribution deviation.

In the above-described embodiments, each of the magnet members 6 and 7 has the substantial semi-cylinder shape. However, the magnet members 6 and 7 can be also provided with other shapes and arranged, for example, parallel to each other when being viewed in the Z-axis direction.

Moreover, at least one of the magnet members 6 and 7 can be constructed of multiple magnets.

The rotation angle detection device according to the present invention can be also suitably used to detect the rotation angle of an apparatus other than the throttle valve, for example, an arm portion of an industrial robot.

Moreover, the magnetism detection unit 2 can be also arranged to deviate from the rotation axis of the rotor 1.

Moreover, the concave degree of the concave portion of the opposite side to the magnetic flux leaking portion a can be set larger than that of the side of the magnetic flux leaking portion α, so that the deviation of the distribution of the magnetic flux can be compensated.

Such changes and modifications are to be understood as being in the scope of the present invention as defined by the appended claims.

What is claimed is:

1. A rotation angle detection device comprising:
   a magnetism detection unit;
   a magnetic flux generation unit for applying magnetic flux to the magnetism detection unit, the magnetic flux generation unit having a rotation axis with respect to which the magnetic flux generation unit is rotated relative to the magnetism detection unit; and
   a magnetic flux alteration unit which is arranged at the magnetic flux generation unit, wherein:
   with respect to a longitudinal direction of the rotation axis, the magnetic flux alteration unit extends along only a part of the magnetic flux generation unit;
   a relative rotation angle between the magnetism detection unit and the magnetic flux generation unit is detected based on a density of the magnetic flux passing through the magnetism detection unit; and
   the magnetic flux alteration unit alters a distribution of the magnetic flux which is generated by the magnetic flux generation unit, to compensate a deviation of the distribution of the magnetic flux.

2. The rotation angle detection device according to claim 1, wherein
   the magnetic flux alteration unit is a magnetic flux abatement unit which is provided for a part of the magnetic flux generation unit to abate the magnetic flux generated by the magnetic flux generation unit.

3. The rotation angle detection device according to claim 2, wherein the magnetic flux abatement unit is a concave portion which is formed at the magnetic flux generation unit.

4. The rotation angle detection device according to claim 1, wherein:
   the magnetism detection unit is disposed at a rotation axis of the magnetic flux generation unit;
   the magnetic flux generation unit includes a magnetic flux supply magnet member for applying the magnetic flux to the magnetism detection unit, and a magnetic flux attraction magnet member for attracting the magnetic flux which is applied to the magnetism detection unit by the magnetic flux supply magnet member; and
   the magnetic flux supply magnet member and the magnetic flux attraction magnet member are opposite to each other and spaced by a gap, in which the magnetism detection unit is arranged.

5. The rotation angle detection device according to claim 4, wherein
   at least one of the magnetic flux supply magnet member and the magnetic flux attraction magnet member is provided with a concave portion as the magnetic flux abatement unit.

6. The rotation angle detection device according to claim 5, wherein:
   each of the magnetic flux supply magnet member and the magnetic flux attraction magnet member has a substantial semi-cylinder shape and faces each other to have a substantially diametrically-divided cylinder shape on the whole; and
   the concave portion is arranged at least one of a radial-direction inner surface and a radial-direction outer surface of at least one of the magnetic flux supply magnet member and the magnetic flux attraction magnet member.

7. The rotation angle detection device according to claim 6, wherein a concave degree of the concave portion of an opposite side to the magnetic flux leaking portion is larger than that of a side of the magnetic flux leaking portion.

8. The rotation angle detection device according to claim 1, wherein
   the magnetic flux alteration unit is a magnetic flux augment unit which is provided for a part of the magnetic flux generation unit to augment the magnetic flux generated by the magnetic flux generation unit.

9. The rotation angle detection device according to claim 8, wherein the magnetic flux augment unit is one of a convex portion, a strong-magnetization member, and an adhesive member made of a permanent.

10. A rotation angle detection device comprising:
    a magnetism detection unit;
    a magnetic flux generation unit for applying magnetic flux to the magnetism detection unit, the magnetic flux generation unit being rotated relative to the magnetism detection unit;

a magnetic flux abatement unit for abating the magnetic flux generated by the magnetic flux generation unit; and a magnetic flux leaking portion which is disposed at a vicinity of the magnetic flux generation unit and causes the magnetic flux generation unit a biased leakage of the magnetic flux, wherein:

a relative rotation angle between the magnetism detection unit and the magnetic flux generation unit is detected based on a density of the magnetic flux passing through the magnetism detection unit; and the magnetic flux abatement unit is arranged at the magnetic flux generation unit and the magnetism detection unit is disposed between the magnetic flux abatement unit and the magnetic flux leaking portion.

11. The rotation angle detection device according to claim 10, wherein the magnetic flux abatement unit is a concave portion which is formed at the magnetic flux generation unit.

12. The rotation angle detection device according to claim 10, wherein:

the magnetism detection unit is disposed at a rotation axis of the magnetic flux generation unit;

the magnetic flux generation unit includes a magnetic flux supply magnet member for applying the magnetic flux to the magnetism detection unit, and a magnetic flux attraction magnet member for attracting the magnetic flux which is applied to the magnetism detection unit by the magnetic flux supply magnet member; and the magnetic flux supply magnet member and the magnetic flux attraction magnet member are opposite to each other and spaced by a gap, in which the magnetism detection unit is arranged.

13. The rotation angle detection device according to claim 12, wherein at least one of the magnetic flux supply magnet member and the magnetic flux attraction magnet member is provided with a concave portion as the magnetic flux abatement unit.

14. The rotation angle detection device according to claim 13, wherein:

each of the magnetic flux supply magnet member and the magnetic flux attraction magnet member has a substantial semi-cylinder shape and faces each other to have a substantially diametrically-divided cylinder shape on the whole; and the concave portion is arranged at least one of a radial-direction inner surface and a radial-direction outer surface of at least one of the magnetic flux supply magnet member and the magnetic flux attraction magnet member.

15. The rotation angle detection device according to claim 14, wherein a concave degree of the concave portion of an opposite side to the magnetic flux leaking portion is larger than that of a side of the magnetic flux leaking portion.

16. The rotation angle detection device according to claim 10, wherein the magnetic flux abatement unit is constructed of a weak-magnetization member.

17. The rotation angle detection device according to claim 10, wherein the magnetic flux abatement unit is an adhesive member which is constructed of a non-magnetic material and bonded to a part of the magnetic flux generation unit to obstruct a generation of the magnetic flux.

18. A rotation angle detection device comprising:

a magnetism detection unit;

a magnetic flux generation unit for applying magnetic flux to the magnetism detection unit, the magnetic flux generation unit being rotated relative to the magnetism detection unit; and a magnetic flux abatement unit for abating the magnetic flux generated by the magnetic flux generation unit, wherein:

a relative rotation angle between the magnetism detection unit and the magnetic flux generation unit is detected based on a density of the magnetic flux passing through the magnetism detection unit;

the magnetic flux abatement unit is arranged at the magnetic flux generation unit and disposed at an opposite side of the magnetism detection unit to a magnetic flux leaking portion, which is disposed at a vicinity of the magnetic flux generation unit and causes the magnetic flux generation unit a biased leakage of the magnetic flux; and the magnetic flux abatement unit is an adhesive member which is constructed of a non-magnetic material and bonded to a part of the magnetic flux generation unit to obstruct a generation of the magnetic flux.

* * * * *